United States Patent
Sakai et al.

[15] 3,666,785
[45] May 30, 1972

[54] 1,3-BIS(ALKOXY-THIO-CARBONYLTHIO)-2-TERTIARY AMINOPROPANE COMPOUNDS

[72] Inventors: Michihiko Sakai, Kyoto, Japan; Masayuki Kato, Osaka, Japan; Hikoichi Hagiwara, deceased, late of Osaka by Reiko Hagiwara, executor; Kazuo Konishi, Osaka, Japan

[73] Assignee: Takeda Chemical Industries, Ltd., Osaka, Japan

[22] Filed: Feb. 13, 1970

[21] Appl. No.: 11,345

Related U.S. Application Data

[62] Division of Ser. No. 612,059, Sept. 22, 1966, Pat. No. 3,501,502, Division of Ser. No. 205,088, June 25, 1962, Pat. No. 3,318,936.

[30] Foreign Application Priority Data

June 27, 1961    Japan..................................36/23009

[52] U.S. Cl..........................................260/455 B
[51] Int. Cl.............................................C07c 154/00
[58] Field of Search......................260/455 B; 424/301

[56] References Cited

UNITED STATES PATENTS

| | | | |
|---|---|---|---|
| 2,840,502 | 6/1958 | Lambrech | 424/301 |
| 2,965,535 | 12/1960 | Birum | 260/455 |
| 3,156,717 | 11/1964 | Rossi | 260/455 |

FOREIGN PATENTS OR APPLICATIONS

| | | | |
|---|---|---|---|
| 976,730 | 12/1964 | Great Britain | 260/455 |
| 763,269 | 12/1956 | Great Britain | 260/455 |

OTHER PUBLICATIONS

Hagiwara et al., " Aminopropane" -1,3-dihalides (1963) CA 59 p. 11250 (1963)

*Primary Examiner*—Elbert L. Roberts
*Assistant Examiner*—G. Hollrah
*Attorney*—Wenderoth, Lind & Ponack

[57]         ABSTRACT

Compounds of the formula

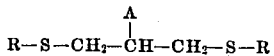

wherein R represents a lower alkoxy-thiocarbonyl group and A represents a tertiary amino group are useful as pesticides.

3 Claims, No Drawings

1,3-BIS(ALKOXY-THIO-CARBONYLTHIO)-2-TERTIARY AMINOPROPANE COMPOUNDS

This application is a divisional application of Application Ser. No. 612,059, filed Sept. 22, 1966, now U.S. Pat. No. 3,501,502, which application is in turn a divisional application of Application Ser. No. 305,088, filed June 25, 1962, now U.S. Pat. No. 3,318,936.

This invention relates to novel compounds and specified use thereof. More particularly, the instant invention is concerned with the new and useful compounds having in their molecule a tertiary amino group and two substituted thio groups, and with the utilization thereof as pesticides for e.g. agricultural and sanitary purposes.

The objective compounds provided by the present invention are represented by any of the formulas (Ia), (Ib) and (Ic);

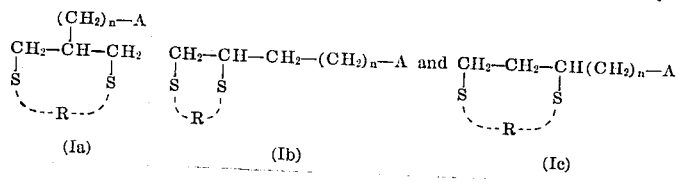

wherein $n$ is an integer from 0 to 4, A stands for a tertiary amino group, and R stands for two hydrogen atoms, two univalent S-substituting groups or a bivalent S-substituting group.

To simplify the disclosure, the terms "S-substituting group" and "substituted thio group" will be frequently used in this specification for expressing "the atomic group combining or to be combined to the sulphur atom or atoms illustrated in the formulas (I)" and "the thio group substituted with the said S-substituting group — i.e. $-S(...R)\frac{1}{2}-$," respectively.

More concretely stated, "S-substituting group" is, for example, cyano, amidino, an N-monosubstituted amidino group, a lower hydrocarbon residue, a lower carboxylic acid acyl group, a lower sulfonic acid acyl group, a lower sulfinic acid acyl group, an N,N-diloweralkyl-thiocarbamoyl group, an N,N-diloweralkylcarbamoyl group, an O,O'-diloweralkylphosphono group, an O,O'-diloweralkyl-thiophosphono group, a loweralkoxy-carbonyl group, a loweralkoxy-thiocarbonyl group, thiocyanato or a mercapto group substituted with a lower hydrocarbon residue as the univalent groups, or, for example, carbonyl, thiocarbonyl, a methylene group substituted with a lower hydrocarbon residue or the bivalent group represented by the part except R of the formula selected from the formulas (I) as the bivalent group.

It was further found by the present inventors that these novel compounds illustrated by the formulas (I) have a remarkable activity for killing insects, mites and nematodes, and therefore are useful for new-type pesticides.

The principal object of the instant invention is, therefore, to provide a series of novel compounds represented by the formulas (I) and their salts, which are useful for killing harmful animals such as insects, mites and nematodes.

Further object is to provide pesticidal compositions which can desirably be applied for agricultural and sanitary purposes to combat harmful insects including mites and nematodes, the compositions being characterized by containing one or more kinds of the compounds represented by the formulas (I) including those in the form of acid salts.

These objective compounds can generally be prepared through any of the following courses.

A. The substituted thio groups are introduced into the corresponding dihalogeno compounds. For this process, dihalogeno compounds represented by one of the formulas (IIa), (IIb) and (IIc):

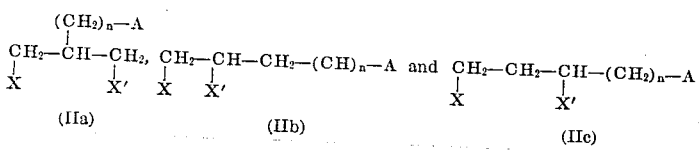

wherein $n$ and A have the same meanings as in the formulas (I), and each of X and X' represents a halogen atom, e.g. chlorine, bromine and iodine, can be used and one of the starting compounds represented by the formulas (II) is allowed to react with a reactant to replace the halogen atom attached to the hydrocarbon skeleton with a mercapto group or with the substituted thio group. As such a reactant, for example, hydrogen sulfide or its salt (such as sodium sulfide, potassium sulfide, ammonium sulfide or a chemical equivalent thereof) to replace the halogen atoms with mercapto groups, thiocyanic acid or its salt (such as sodium thiocyanate, potassium thiocyanate, ammonium thiocyanate or a chemical equivalent thereof) to replace the halogen atoms with thiocyanato groups (—SCN); a mercaptan (such as methyl mercaptan, ethyl mercaptan, propyl mercaptan, butyl mercaptan, hexyl mercaptan, cyclohexyl mercaptan, benzyl mercaptan, thiophenol or chemical equivalent thereof) or a mercaptide thereof (such as the sodium mercaptide, the potassium mercaptide, the zinc mercaptide, the silver mercaptide or a chemical equivalent thereof of the mercaptans as exemplified above) to replace the halogen atoms with two mercapto groups both substituted with a lower hydrocarbon residue; thiourea or an N-substituted thiourea (such as methyl thiourea, ethyl thiourea, propyl thiourea, allyl thiourea, butyl thiourea, benzyl thiourea, phenyl thiourea or a chemical equivalent thereof) or an acid salt thereof (such as the hydrochloride, the hydrobromide or a chemical equivalent thereof of thiourea or of the N-monosubstituted thiourea as exemplified above) to replace the halogen atoms with amidinothio groups; a lower thiocarboxylic acid (such as thiolacetic acid, thiolbenzoic acid, thiolfuroic acid or a chemical equivalent thereof) or a salt thereof (such as the sodium salt, the potassium salt, the ammonium salt, the lead salt or a chemical equivalent thereof of the thiolcarboxylic acids as exemplified above) to replace the halogen atoms with lower carboxylic acyl-thio groups; a lower thiolsulfonic acid (such as methane thiolsulfonic acid, ethane thiolsulfonic acid, propane thiolsulfonic acid, benzene thiolsulfonic acid, p-toluene thiolsulfonic acid or a chemical equivalent thereof) or a salt thereof (such as the sodium salt, the potassium salt, the ammonium salt or a chemical equivalent thereof of the thiolsulfonic acids as exemplified above) to replace the halogen atoms with lower sulfonic acid acyl-thio groups; a lower thiolsulfinic acid (such as methane thiolsulfinic acid, ethane thiolsulfinic acid, propane thiosulfinic acid, benzene thiolsulfinic acid, p-toluene thiolsulfinic acid or a chemical equivalent thereof of the thiolsulfinic acids as exemplified above) to replace the halogen atoms with lower sulfinic acid acyl-thio groups; an N,N-disubstituted dithiocarbamic acid, such as N,N-diethyldithiocarbamic acid, N,N-dipropyldithiocarbamic acid, N,N-dibutyldithiocarbamic acid, N,N-dipentyldithiocarbamic acid or a chemical equivalent thereof) or a salt thereof (such as the sodium salt, the potassium salt, the ammonium salt or a chemical equivalent thereof of the N,N-disubstituted dithiocarbamic acids as exemplified above) to replace the halogen atoms with the N,N-diloweralkyl-thiocarbamoylthio groups; an N,N-disubstituted thiolcarbamic acid (such as N,N-dimethylthiolcarbamic acid, N,N-dipropylthiolcarbamic acid, N,N-dibutylthiolcarbamic acid, N,N-dipentylthiolcarbamic acid or a chemical equivalent thereof) or a salt thereof (such as the sodium salt, the potassium salt, the ammonium salt or a chemical equivalent thereof of the N,N-disubstituted thiolcarbamic acids as exemplified above) to replace the halogen atoms with the N,N-diloweralkyl-carbamoylthio groups; an O,O'-disubstituted thiolphosphoric acid (such as O,O'-dimethyl hydrogen thiolphosphate, O,O'-diethyl hydrogen thiolphosphate, O-methyl-O'-ethyl hydrogen thiolphosphate, O,O'-dipropyl hydrogen thiolphosphate, O,O'-dibutyl hydrogen thiolphosphate, O,O'-dipentyl, hydrogen thiolphosphate or a chemical equivalent thereof) or a salt thereof (such as the sodium salt, the potassium salt, the ammonium salt or a chemical equivalent thereof of the O,O'-disubstituted thiolphosphoric acid as exemplified above) to replace the halogen atoms with the O,O'-diloweralkylphosphonothio groups; an O,O'-disubstituted thiolthionphosphoric acid (such as O,O'-dimethyl hydrogen thiolthionphosphate, O,O'-diethyl hydrogen thiolthionphosphate, O-methyl-O'-ethyl hydrogen thiolthionphosphate, O,O'-dipropyl hydrogen thiolthionphosphate, O,O'-dibutyl hydrogen thiolthionphosphate, O,O'-dipentyl hydrogen thiolthionphosphate or a chemical equivalent thereof) or a salt thereof (such as the sodium salt, the potassium salt or a chemical equivalent thereof of the O,O'-disubstituted thiolthionphosphoric acid as exemplified above) to replace the halogen atoms with the O,O'-diloweralkyl-thiophosphonothio groups; a xanthogenic acid (such as methyl xanthogenic acid, ethyl xanthogenic acid, propyl xanthogenic acid, pentyl xanthogenic acid or a chemical equivalent thereof) or a salt thereof (such as the sodium salt, the potassium salt, the ammonium salt or a chemical equivalent thereof of the xanthogenic acid as exemplified above) to replace the halogen atoms with the loweralkoxy-thiocarbonylthio groups; a salt (such as the sodium salt, the potassium salt or the ammonium salt) of an O-monoloweralkylester (such as the methyl, the ethyl or the propyl ester) of monothiolcarbonic acid to replace the halogen atoms with the loweralkoxycarbonylthio groups; a salt of thiosulfuric acid (such as sodium thiosulfate, potassium thiosulfate or ammonium thiosulfate) to replace the halogen atoms with sulfothio groups in the form of partial salts —i.e. in the form of Bunte's salts—; an alkali metal trithiocarbonate to replace the halogen atoms with a group —S-CS-S—; and hydrogen disulfide or its salt (such as sodium disulfide, potassium disulfide or ammonium disulfide) to replace the halogen atoms with dithio groups between two molecules of the starting halogeno compounds —whereby the 1,2,6,7-tetrathiecane ring or the 1,2,5,6-tetrathiocane ring is formed— can be used.

The reaction is carried out by allowing the dihalogeno compound of any of the formulas (II) to react with the thiol compound or its functional derivative as mentioned above. Usually there is used the thiol compound or its functional derivative in an amount of not less than twice as much as the used dihalogeno compound on molar basis. When the thiol compound or its functional equivalent in about equimolar amount relative to the dihalogeno compound is used, the corresponding monosubstituted thio monohalogeno compound is produced as a principal product, on which a similar reaction for replacing the residual halogen atom with the same or the other substituted thio group or a mercapto group is repeatedly brought about; this means is conveniently applied for producing those objective products whose two substituted thio groups are different from each other.

The reaction is preferably carried out in an appropriate solvent such as water, methanol, ethanol, propanol, acetone, methyl ethyl ketone, cyclohexanone, ether, dioxane, tetrahydrofuran, dimethylformamide, pyridine, 2-methyl-5-ethylpyridine, benzene, chloroform or a mixture of two or more kinds of these, the solvent should be selected in accordance with the kind of the used thiol compounds. Usually, the reaction can smoothly proceed at room temperature and, if desired or if required, the reaction mixture may, of course, be heated or cooled according to the progress of the reaction.

B. The tertiary amino group represented by A in the aforepresented formulas (I) is introduced into the corresponding halogeno compounds represented by one of the formulas (IIIa), (IIIb) and (IIIc):

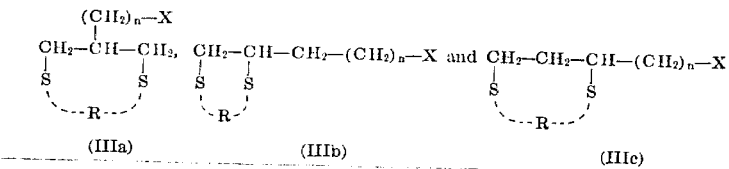

(IIIa)   (IIIb)   (IIIc)

wherein n and R have the same meaning as in the formulas (I), and X represents a halogen atom, e.g. chlorine, bromine and iodine. The starting halogeno compound represented by one of the formulas (III) is allowed to react with a secondary amine, or with a primary amine, and, in the latter case, followed by a further procedure of substitution of hydrogen atom in the resulting secondary amine with a halogenated hydrocarbon or with a ketone or an aldehyde and formic acid according to the so-called "Leuckart Reduction (or Reaction)." However, the reaction with a secondary amine is more advantageous than the reaction with a primary amine, since not only is there no need to carry out the subsequent reaction in the case of the former reaction, but also there is less opportunity to produce a mixture of secondary amine and tertiary amine than in the case of the latter reaction. As the secondary amine to be used for the former reaction, for example, dimethylamine, diethylamine, methyl ethyl amine, dipropylamine, dibutylamine, diamylamine, di-sec-butylamine, di-iso-butylamine, dicyclohexylamine, diphenylamine, monomethylaniline, monoethylaniline, monomethyltoluidine, pyrrol, pyrroline, pyrrolidine, piperidine, piperazine, morpholine, thiomorpholine, azirane (ethylenimine) or a chemical equivalent thereof can be used.

The reaction is carried out by allowing the halogeno compound of the formulas (III) to react with the aforementioned amine in an excess of the amine or in an appropriate organic solvent such as methanol, ethanol, propanol, acetone, dioxane, dimethylformamide, tetrahydrofuran, benzene, toluene or a chemical equivalent thereof. As one mole of hydrogen halide is produced as the reaction proceeds, one further mole of the used amine may be consumed for neutralizing the produced hydrogen halide, if any other suitable alkali co-exists in the reaction mixture. Therefore, if it is desired to avoid the consumption of the used amine for the neutralization, e.g. from the point of economical view, the procedure may be somewhat modified in such a manner that a strong alkali is gradually added to the reaction mixture containing the starting halogeno compound and about equivalent of the amine. In general the reaction can be promoted by heating at a temperature lower than 200° C. Of course, according to the kind of the used starting materials, there are cases in which the reaction can be carried out smoothly at room temperature. Moreover, the reaction may be carried out under atmospheric pressure or under superatmospheric pressure if desired, but usually it is sufficient with pressure lower than 30 atmospheres.

When the substituted thio group is a thiol group substituted with a lower hydrocarbon residue, another modified procedure can be applied for the production of the objective compound. In this procedure, however, an oxo compound is used as the starting compound instead of the halogeno compound, and the reaction is carried out under reducing conditions. The reducing conditions can be provided by allowing a reducing agent to exist in the reaction mixture or by subjecting the reaction mixture to catalytic reduction. As the reducing agent, for example, an alkali metal and a lower alcohol, iron and hydrochloric acid, iron and acetic acid, sodium amalgam, or a chemical equivalent thereof can be used.

C. A product, which was produced by either procedure mentioned in item (A) or (B), can be changed into other compounds, also represented by the formulas (I), by modifying the substituted thio groups into some other substituted thio groups. The means for the modification are exemplified as follows:

a. Among the compounds of the formulas (I), those having two thiol groups as the substituted thio groups are changed into those having two —S-S-R' groups, wherein R' represents a lower hydrocarbon residue. One of the dithiol compounds is allowed to react with an agent for introducing —S-R' group, into the thiol groups. As the agent for introducing —S-R' group, a variety of thiol esters can be used. For example, a thiol ester (such as methyl, ethyl, phenyl, benzyl or tolyl ester) of thiosulfuric acid or its water soluble salt (Bunte's salts), a thiol ester of a thiolsulfonic acid (such as a methanethiolsulfonate, an ethanethiolsulfonate, a benzenethiolsulfonate, a toluenethiolsulfonate or a chemical equivalent thereof), a thiol ester of a thiolsulfinic acid (such as methanethiolsulfinate, an ethanethiolsulfinate, toluenethiolsulfinate or a chemical equivalent thereof), an ester of thiothiocyanate, a sulfenyl halide (such as a sulfenyl chloride, a sulfenyl bromide or a sulfenyl iodide) or any of their chemical equivalents may be used. The hydrocarbon residue of the above-exemplified thiol esters, the residue being to be introduced into the objective compounds together with the sulphur atom to which the residue is combined, may respectively be methyl, ethyl, propyl, isopropyl, allyl, butyl, isobutyl, amyl, hexyl, heptyl, phenyl, tolyl, cyclohexyl, benzyl or their chemically equivalent group, for example.

The reaction is generally carried out in a suitable solvent such as water, methanol, ethanol, dioxane, tetrahydrofuran, dimethylformamide, benzene, toluene, or a mixture of two or more kinds of them, and smoothly proceeds in the medium adjusted to about pH 7.0 to 9.0 at room temperature. But, in some cases, favorable result may be obtained by heating the reaction mixture at a temperature lower than about 100° C.

b. The compounds of the formulas (I), which have two thiol groups as the substituted thio groups, are also changed into those having any of carboxylic acyl groups, sulfonic acyl groups, sulfinic acyl groups, a carbonyl group or a thiocarbonyl group as S-substituting groups. One of the dimercapto compounds or mercaptides thereof is allowed to react with an acylating agent.

As the carboxylic acylating agent, for example, a carboxylic acid (such as formic acid, acetic acid, propionic acid, acrylic acid, butyric acid, isobutyric acid, crotonic acid, valeric acid, isovaleric acid, caproic acid, enanthic acid, sorbic acid, succinic acid, maleic acid, glutaric acid, acetoacetic acid, levulinic acid, chloroacetic acid, trichloroacetic acid, cyanoacetic acid, cyclopentanecarboxylic acid, hexahydrobenzoic acid, benzoic acid, chlorobenzoic acid, nitrobenzoic acid, furoic acid or a chemical equivalent thereof); its acid halide (such as an acid chloride, an acid bromide or an acid iodide of the carboxylic acid as exemplified above), its acid anhydride (including a homogeneous acid anhydride between two molecules of the same carboxylic acid as exemplified above; a mixed (heterogeneous) acid anhydride between the carboxylic acid as exemplified above and the other carboxylic acid as exemplified above; a mixed acid anhydride between the carboxylic acid as exemplified above and a volatile acid such as carbonic acid mono ester, or an intramolecular acid anhydride when a carbon chain consisting of two or more carbon atoms is interposed between two carboxylic groups), the thiolcarboxylic acid corresponding to the carboxylic acid as exemplified above; the ketene corresponding to the carboxylic acid as exemplified above when the carboxylic acid has the partial structure —$CH_2$-$CH_2$-COOH; a lower alkyl ester of the carboxylic acid or of thiolcarboxylic acid as exemplified above (such as the methyl, the ethyl, or the propyl ester of the carboxylic acid or of the thiol carboxylic acid) or a chemical equivalent thereof may be used.

As the sulfonic acylating agent, for example, a sulfonic acid (such as methanesulfonic acid, ethanesulfonic acid, propanesulfonic acid, hexanesulfonic acid, benzenesulfonic acid, o-toluenesulfonic acid, p-toluenesulfonic acid, cyclohexanesulfonic acid, phenylmethanesulfonic acid or a chemical equivalent thereof); its acid halide (such as an acid chloride, an acid bromide or an acid iodide of the sulfonic acid as exemplified above) or its acid amide can be used.

As the sulfinic acylating agent, for example, any of the sulfinic acids or their acid halides corresponding to the sulfonic acids or their acid halides as mentioned in the preceding paragraph can be used.

For introducing carbonyl or thiocarbonyl group as S-substituting groups, a carbonyl or thiocarbonyl halide (such as phosgene, carbonyl bromide, thiophosgene or thiocarbonylbromide) can be used.

The reaction is generally carried out in a suitable solvent such as water, methanol, ethanol, propanol, dioxane, tetrahydrofuran, pyridine, dimethylformamide, a chemical equivalent thereof or a mixture of two or more kinds of them, and usually proceeds in an alkaline to neutral medium. Usually, the reaction can be carried out at room temperature, but it may be operated under cooling or heating when required.

In a similar way, the compounds of the formulas (I), which have methylene or a methylene group substituted with a lower hydrocarbon residue as the S-substituting groups, are produced by subjecting the dimercapto compounds or their mercaptides to a condensation reaction with an aldehyde (such as formaldehyde, acetaldehyde, propionaldehyde, butyraldehyde, isobutyraldehyde, caproaldehyde, benzaldehyde, p-tolualdehyde or o-tolualdehyde) or an alkylidene halide (such as methylene chloride, methylene bromide, ethylidene chloride, propylidene bromide, benzal chloride or a chemical equivalent thereof). By the reaction, a 1,3-dithiolane ring or 1,3-dithiane ring is formed.

c. The compounds of the formulas (I), which have two lower hydrocarbon residues or a methylene substituted with a lower hydrocarbon residue as S-substituting groups, are changed into those having two thiol groups as the substituted thio groups, i.e. having hydrogen atoms in place of the S-substituting groups.

The reaction is carried out under reducing conditions and/or in the presence of a heavy metal salt. In order to eliminate the hydrocarbon residue attached to the sulphur atom, fairly strong reduction is required and there is used a rather strong reducing agent such as an alkali metal (e.g. metallic sodium, metallic potassium, metallic lithium), the alkali metal as exemplified above and a lower alcohol (e.g. methanol, ethanol or a chemical equivalent thereof), the alkali metal as exemplified above and an acid (e.g. acetic acid or a chemical equivalent thereof), an amalgam of the alkali metal as exemplified above, an alkali metal amide (e.g. sodium amide, lithium amide or potassium amide), formic acid, or hydrogen in the presence of a metallic catalyst (e.g. Raney nickel, platinum, palladium or a chemical equivalent thereof). The reaction is usually carried out in a suitable solvent such as methanol, ethanol, liquid ammonia, dimethylamine, diethylamine, pyridine, 5-ethyl-2-methylpyridine, dimethylformamide, diethylether, tetrahydrofuran, dioxane or a chemical equivalent thereof, selected suitably in accordance with the kind of the reducing agent to be used.

In place of or together with the reducing agent, a heavy metal salt can be used for the reaction to eliminate the hydrocarbon residue of the substituted thio group to form the dithiol compounds, which are produced in the form of the mercaptide of the used heavy metal and the subsequent introduction of hydrogen sulfide into the suspension of the mercaptide affords the free thiol compounds. As the heavy metal salt for this purpose, for example, water-soluble salt of a metal such as lead, mercury or zinc can be used and the reaction is carried out in a suitable solvent such as water, chloroform, benzene, ether, their chemical equivalent or two or more kind of them. In this case, heating accelerates desirably the reaction velocity.

By the reaction or reactions mentioned above, there can be produced the desired compounds (I) such as:

1,2-dimercapto-3-dimethylaminopropane,
1,2-dithiocyanato-3-dimethylaminopropane,
1,2-bis(amidinothio)-3-dimethylaminopropane,
1,2-bis(benzylthio)-3-dimethylaminipropane,
1,2-bis(benzyldithio)-3-dimethylaminopropane,
1,2-bis(n-propyldithio)-3-dimethylaminopropane,
1,2-bis(benzoylthio)-3-dimethylaminopropane,
1,2-bis(furoylthio)-3-dimethylaminopropane,
1,2-bis(acetylthio)-3-dimethylaminopropane,
1,2-bis(n-hexylthio)-3-dimethylaminopropane,
1,2-bis(methanesulfonylthio)-3-dimethylaminopropane,
1,2-bis(n-propoxycarbonylthio)-3-dimethylaminopropane,
1,2-bis(di-n-propoxyphosphinothio)-3-dimethylaminopropane,
1,2-bis(n-hexyldithio)-3-dimethylaminopropane,
1,2-bis(4-ethoxycarbonylbutyrylthio)-3-dimethylaminopropane,
1,2-bis(methyldithio)-3-(3-dimethylaminopropyl)propane,
1,2-bis(p-toluenesulfonylthio)-3-diethylaminopropane,
1,2-bis(phenoxycarbonylthio)-3-diethylaminopropane,
1,2-bis(benzylsulfinylthio)-3-diethylaminopropane,
1,2-bis(methylethylcarbamoylthio)-3-diethylaminopropane,
1,2-bis(3-ethoxycarbonylpropionylthio)-3-diethylaminopropane,
1,2-bis(ethoxy-thiocarbonylthio)-3-diethylaminopropane,
1,2-bis(n-propyldithio)-3-diethylaminopropane,
1,2-bis(amidinothio)-3-methylethylaminopropane dihydrochloride,
1,2-bis(benzylthio)-3-methylethylaminopropane,
1,2-bis(diethylcarbamoylthio)-3-diallylaminopropane,
1,2-bis(benzylthio)-3-di-n-amylaminopropane,
1,2-bis(benzylthio)-3-dibenzylaminopropane,
1,2-bis(benzensulfinylthio)-3-dibenzylaminopropane,
1,2-bis(n-propyldithio)-3-dibenzylaminopropane,
1,2-bis(phenylthio)-3-phenylethylaminopropane,
1,2-bis(n-amylthio)-3-cyclohexyl-n-propylaminopropane,
1,2-bis(dibenzylcarbamoylthio)-3-dicyclohexylaminopropane,
1,2-dimercapto-3-dicyclohexylaminopropane,
1,2-bis(benzylthio)-3-piperidinopropane,
1,2-bis(benzenesulfinylthio)-3-piperidinopropane,
1,2-bis(di-n-propoxyphosphinothio)-3-piperidinopropane,
1,2-bis(benzyldithio)-3-piperidinopropane,
1,2-dimercapto-3-piperidinopropane,
1,2-bis(ethylthio)-3-pyrrolidinopropane,
1,2-bis(methanesulfonylthio)-3-aziridinylpropane,
1,2-bis(n-propoxythiocarbonylthio)-3-aziridinylpropane,
1,2-bis(dimethoxyphosphinothioylthio)-3-thiomorpholinopropane,
1,2-bis(amidinothio)-3-morpholinopropane dihydrochloride,
1,2-bis(thiocyanatothio)-3-morpholinopropane,
4-dimethylaminomethyl-2-phenyl-1,3-dithiolane,
4-piperidinomethyl-1,3-dithiolane-2-thione,
4-diethylaminomethyl-2-phenyl-1,3-dithiolane,
4-dicyclohexylaminomethyl-1,3-dithiolan-2-one,
3-diethylaminopropane-1,2-bis(sodium thiolsulfate),
1,3-bis(benzylthio)-2-dimethylaminopropane,
1,3-bis(acetylthio)-2-dimethylaminopropane,
1,3-bis(diethoxyphosphinothionylthio)-2-dimethylaminopropane,
1,3-bis(diethoxyphosphinothio)-2-dimethylaminopropane,
1,3-dithiocyanate-2-dimethylaminopropane,
1,3-bis(ethoxythiocarbonylthio)-2-dimethylaminopropane,
1,3-bis(diethylthiocarbamoylthio)-2-dimethylaminopropane,
1,3-bis(amidinothio)-2-dimethylaminopropane dihydrochloride,
1,3-bis(ethyldithio)-2-dimethylaminopropane,
1,3-bis(thiocyanatothio)-2-dimethylaminopropane,
1,3-bis(benzylsulfonylthio)-2-dimethylaminopropane,
1,3-bis(furoylthio)-2-dimethylaminopropane,
1,3-bis(benzyldithio)-2-dimethylaminopropane,
1,3-bis(n-propyldithio)-2-dimethylaminopropane,
1,3-bis(benzoylthio)-2-dimethylaminopropane,
1,3-dimercapto-2-dimethylaminopropane,
1,3-bis(benzylthio)-2-(4-dimethylaminobutyl)propane,
1,3-bis(benzylthio)-2-diethylaminopropane,
1,3-bis(benzylthio)-2-piperidinopropane,
1,3-bis(ethoxythiocarbonylthio)-2-diethylaminopropane,
1,3-bis(ethylthio)-2-morpholinopropane,
1,3-bis(ethylthio)-2-piperidinopropane,
1,3-bis(ethylthio)-2-pyrrolidinylpropane,
1,3-bis(methylthio)-2-methylethylaminopropane,
1,3-bis(allylthio)-2-diisopropylaminopropane,
1,3-bis(n-butylthio)-2-dibutylaminopropane,
1,3-bis(2-methylhexylthio)-3-dicyclohexylaminopropane,
1,3-bis(phenylthio)-2-aziridinylpropane,
1,3-bis(benzylthio)-2-thiomorpholinopropane,
1,3-bis(ethanesulfinylthio)-2-di-n-amylaminopropane,
1,3-bis(benzenesulfonylthio)-2-diphenylaminopropane,
1,3-bis(ethoxycarbonylthio)-2-phenylmethylaminopropane,
1,3-bis(propionylthio)-2-phenylethylaminopropane,
1,3-bis(chloroacetylthio)-2-diallylaminopropane,
1,3-bis(p-nitrobenzoylthio)-2-aziridinylpropane,
1,3-bis(benzylsulfinylthio)-2-dimethylaminopropane,
1,3-bis(dimethylcarbamoylthio)-2-pyrrol-1-ylpropane,
1,3-bis(phenylamidinothio)-2-pyrrolin-1-ylpropane dihydrobromide
1,3-bis(dimethoxyphosphinothio)-2-diethylaminopropane,
1,3-bis(allyldithio)-2-di-sec-butylaminopropane,
1,3-bis(cyclopentyldithio)-2-diallylaminopropane,
1,3-bis(phenyldithio)-2-di-n-propylaminopropane,
1,3-dimercapto-2-morpholinopropane,
2-dimethylaminopropane-1,3-bis(sodium thiosulfate),
5-dimethylamino-2-propyl-1,3-dithiane,
5-methyl-p-tolylamino-1,3-dithian-2-one,
5-piperidino-2-phenyl-1,3-dithiane,
5-dimethylamino-1,3-dithiane-2-thione, etc.

The compounds (I) are relatively strong bases owing to the tertiary amino group and, in some cases, the amidine or the N-monosubstituted amidino groups or the carbamino groups, and form stable acid addition salts. Those compounds (I) which have thiol groups can form salts with a strong alkali owing to the acid property of the thiol group to form a mercaptide. The compounds (I) can be obtained and utilized in the form of acid addition salts or mercaptides as well as in the free form. The acid which can be used to prepare the acid addition salt is suitably selected from those which produce, when combined with the compounds (I) in the form of free bases, addition salts whose anions do not lessen the pesticidal properties inherent in the free bases. The strong alkali which can use to prepare the mercaptide is also selected from those which produce, when combined with the thiol compounds among the compounds (I), mercaptides whose cations do not lessen the pesticidal properties inherent to the thiol compounds. Appropriate acid addition salts are, for example, those derived from inorganic acids such as hydrochloric, hydrobromic, hydroiodic, chloric, bromic, iodic, perchloric, perbromic, periodic, sulfuric, nitric, phosphoric and arsenic acids, and from organic acids such as maleic, citric, tartaric, oxalic, benzenesulfonic, toluenesulfonic, ethanesulfonic, picric acids or those derived from alkylhalides such as methyl iodide, ethyl iodide, etc. Appropriate mercaptides are, for example, those derived from strong alkalis such as sodium hydroxide and potassium hydroxide, or those from salts of heavy metals such as lead, copper, zinc or the like.

As briefly stated hereinbefore, the novel compounds thus prepared were found to show activity for killing lower animals such as insects, mites or nematodes, but not to show so much toxicity for vertebrates including mammals and fowls or for plants. Owing to these characteristic properties, the compounds are used as main components for pesticides, especially for insecticides.

When the compounds are brought into practice as pesticides for agricultural and sanitary purposes, the compounds are generally processed so as to fit the intended purposes to form compositions, for example, wettable powder, solution, emulsifiable solution, dust or aerosol.

For the preparation of the compositions, a variety of adjuvants may be employed. One or more kinds of the compounds are dissolved or dispersed in an appropriate liquid adjuvant when used as solution, emulsifiable solution or aerosol. As the liquid adjuvant to be used as solvents, for example, water, lower alcohols (such as methanol, ethanol, isopropanol, butanol, glycerol or ethylene glycol), ketones (such as acetone, methyl ethyl ketone, cyclohexanone or cyclopentanone), ethers (such as dioxane, tetrahydrofuran, ethylene glycol monomethyl ether or diethylene glycol monomethyl ether), aliphatic hydrocarbons (such as n-hexane, gasoline, kerosene, fuel oil, lubricating oil or machine oil); aromatic hydrocarbons (such as benzene, toluene, xylene, solvent naphtha or methyl naphthalene), essential oils, terpenes, chlorinated biphenyl or cottonseed oil can be used. The solvent is often used in a mixture of the solvents as exemplified above, since the solvent to be used is desired to be not only excellent in its solubility but also less toxic for plants or human bodies.

For perparing dust composition of the compounds, there are usually employed dust diluents or carriers. One or more kinds of the compounds are finely pulverized, for example, in a ball mill, edge runner or impact pulverized, and the thus pulverized compounds are admixed with dust diluents or carriers. As the diluents or the carriers, for example, vegetable powder (such as soybean flour, wheat flour, tobacco powder, walnut flour or saw dust), clay (such as kaolin, kaolinite, saponite, vermiculite, beidellite, montomorillonite —bentonite or Fuller's earth— or attapulgite), talc, pyrophyllite, calcium lime, magnesium lime, diatomaceous earth, silica, hydroxyapatite, calcium carbonate, dolomite, calcite, calcium sulfate, hydrated alumina, carbon black or sulphur can be used.

Another kind of adjuvant is surface active agent which is used as sticking or developing agent, emulsifier, or solubilizer for improving the effect or the stability of compositions. Among commercially available surface active agents, salts of sulfonated castor oil, salts of alkyl aryl sulfonates or non-ionic surfactants such as polyoxyethylene diaryl ether, polyoxyethylene alkyl aryl ether and polyoxyethylene sorbitan monoacylate (the acyl group having 10 to 18 carbon atoms) are preferably used as emulsifying and solubilizing agents for the compositions of the present invention.

The pesticidal compositions of the present invention may contain other pesticides (such as benzenehexachloride (BHC), dichlorodiphenyltrichloroethane (DDT), aldrin, dieldrin, endrin, pyrethrin, rotenone, parathion or the other organic phosphorus poisons), acaricides, nematocides, fungicides, herbicides, attractants or repellents. They may also contain growth hormones, fertilizers, or perfumes, all these additions being considered the adjuvants in the compositions of the instant invention.

The compounds (I) or compositions thereof of the present invention were observed to have the effect to kill a wide variety of insects, mites and nematodes, and exterminate those harmful animals as exemplified below or at least lessen remarkably the number of surviving animals: The examples of plant feeding insects etc. are:

Colorado potato beetle (Leptinotarsa decemilineata),
Large 28-spotted lady beetle (Epilachna vigintioctomaculata),
28-Spotted lady beetle (Epilachna sparsa orientalis),
Striped flea beetle (Phyllotreta striolata),
Cucurbit leaf beetle (Aulacophora femoralis, adult),
Grape leaf beetle (Acrothinium gackkwittchii, adult),
Red bean beetle (Callosobrunchus chinensis),
German cockroach (Blattela germanica),
Rice leaf beetle (Lema oryzae),
House fly (Musca domestica),
Cabbage sawfly (Athalia rosae japonensis, larva)
Rice stem borer (Chilo suppressalis),
Tobacco cutworm (Prodenia litura),
Rice plant skipper (Parnara guttata, larva),
Rice green caterpillar (Naranga aenescens, larva),
Cabbage armyworm (Barathra brassicae, larva)
Giant bagworm (Cryptothelea formosicola, larva),
Pea bagworm (Cryptothelea minuscula, larvae),
Pale clouded yellow (Colias hyale poliographus, larvae),
Cabbage worm (Pieris rapie, larva),
Citrus red mite (Qetranychus citri),
Soybean aphid (Aphis glycines),
Turnip aphid (Rhapalosiphum pseudobrassicae),
Two-spitted mite (Tetranychus bimaculatus), etc.

Compositions for direct application to vegetation may contain from 0.1 to 10 percent or more of the compound(s) (I) by weight. When the composition is designed as a concentrate for preparation of sprays or more dilute dusts, the contents of the compound(s) (I) may vary from 10 to 90 percent by weight.

The pesticidal activity of the compounds (I) is illustrated with reference to a typical representative of experiments.

EXPERIMENT 1.

An emulsion of the test compound illustrated in Table I was sprayed over soybean plants infested with soybean aphids (Aphis glycines) or over kidney bean plants on which two-spotted mites (Tetranychus bimaculatus) are kept, the plants being cultivated on a turn-table. After 48 hours, the number of surviving soybean aphids or two-spotted mites was counted to calculate the survival rate. The emulsions used were prepared by dissolving 10 parts by weight of the test compounds in 100 parts by volume of 50 percent aqueous ethanol mixture containing 20 parts by volume of sorbitan laurate polyoxyethylene ether (Tween 20), and by diluting the solution with tap water so as to the concentration of the test compound to 0.2 percent. The figures in Table 1 are mean values of three to six data obtained by experiments carried out parallelly.

TABLE 1

| Test compound | Survival rates(%) | |
|---|---|---|
| | Soybean aphids | Two-spotted mites |
| 1,3-Bis(propyldithio)-2-dimethylaminopropane hydrogen oxalate | 0 | 0 |
| 1,3-Dimercapto-2-dimethylaminopropane hydrogen oxalate | 0 | 0 |
| 4,7-Bis(dimethylamino)-1,2,6,7-tetrathiecane dihydrogen dioxalate | 0 | 0 |
| 1,2-Bis(benzylthio)-3-dimethylaminopropane hydrogen oxalate | 33.3 | – |
| Control (Tap water) | 112.0 | 81.7 |

EXPERIMENT 2.

The test compounds were dissolved in tap water containing 0.02 percent of a sticking agent, so as to adjust the concentration of the test compound as illustrated in Table 2. As the sticking agent, the composition consisting of 20 percent of alkylphenol polyethylene glycol ether, 12 percent of lignin sulfonic acid and 68 percent of aqueous methanol was added. Young leaves of Chinese cabbage were immersed in the thus prepared test solution for several seconds and the wet leaves were allowed to stand in air until the surface of the leaves dried. The leaves thus treated were placed in the pots of 9 centimeters in diameter and 3 centimeters in height. Test insects, i.e. cabbage worms (Pieris rapae, larvae) or striped flea beetles (Phyllotreta striolata, adults), were set free on the leaves. After 24 hours, the number of killed insects were respectively counted. Results are shown in Table 2.

TABLE 2

| Test compound | Cabbage worms | | Striped flea beetles | |
|---|---|---|---|---|
| | Concentration of test compound(%) | killed/used | Concentration of test compound(%) | killed/used |

| | | | | |
|---|---|---|---|---|
| 1,3-Bis(propyldithio)-2-dimethylaminopropane hydrogen oxalate | — | — | 0.02 | 9/20 |
| 4,9-Bis(dimethylamino)-1,2,6,7-tetrathiecane dihydrogen dioxalate | 0.02 | 8/8 | — | — |
| | 0.01 | 8/8 | | |
| 5-Dimethylamino-1,3-dithiane-2-thione hydrogen oxalate | 0.02 | 5/8 | 0.02 | 20/20 |
| | 0.01 | 8/8 oxalate | | |
| 1,2-Bis(acetylthio)-3-dimethylaminopropane hydrogen oxalate | — | — | 0.02 | 19/20 |
| 1,2-Dimercapto-3-dimethylaminopropane | — | — | 0.02 | 20/20 |
| Control | 0 | 0/8 | 0 | 0/20 |

EXPERIMENT 3

The test compounds were dissolved in the water containing 0.05 percent of the sticking agent as used in Experiment 2, so as to adjust the concentration of the test compound as illustrated in Table 3. Rice plants growing on 1/5000-are-Wagner-pot were sprayed with 10 cubic centimeters per pot of the above-prepared solution. Matured eggs of rice stem borer (Chilo suppressalis) were placed on the thus-sprayed rice plants. After a week from when the larvae had entered into the stems, the stems were cut open to count the number of surviving larvae.

TABLE 3

| Test compound | Concentration of test compound(%) | Average of survival rates of larvae (%) |
|---|---|---|
| 1,3-Bis(propyldithio)-2-dimethylaminopropane hydrogen oxalate | 0.025 | 33.1 |
| | 0.05 | 30.0 |
| 4,9-Bis(dimethylamino)-1,2,6 7-tetrathiecane dihydrogen dioxalate | 0.025 | 0.0 |
| | 0.05 | 0.0 |
| Control | 0 | 64.2 |

EXPERIMENT 4

The test compounds were dissolved in water containing sorbitan laurate polyoxyethylene ether in an amount of twice as much as the test compounds. Leaves of radish were immersed in the thus-prepared solution and the wet leaves were allowed to stand in air until the surface of leaves dried. The leaves thus treated were placed in glass pots. Twenty larvae of "Daikon" leaf beetles (Phaedon brassicae) were set free in each pot. After 48 hours, the number of killed insects was counted to calculate mortality. The figure of mortality in Table 4 is the average value of data obtained by duplicate trials.

TABLE 4

| Test compound | Concentration of test compound(%) | Average mortality (%) |
|---|---|---|
| 1,3-Bis(propyldithio)-2-dimethyl-aminopropane hydrogen oxalate | 0.1 | 81.3 |
| | 0.02 | 77.3 |
| 1,3-Dimercapto-2-dimethylaminopropane hydrogen oxalate | 0.1 | 100.0 |
| | 0.02 | 100.0 |
| 1,2-Dimercapto-3-dimethylaminopropane hydrogen oxalate | 0.1 | 100.0 |
| | 0.02 | 81.3 |
| 1,3-Dithiocyanato-2-dimethylaminopropane hydrogen oxalate | 0.1 | 95.2 |
| | 0.02 | 74.5 |
| 1,3-Bis(ethyldithio)-2-dimethyl-aminopropane hydrogen oxalate | 0.1 | 100.0 |
| | 0.02 | 100.0 |
| Control | 0 | 0.0 |

EXPERIMENT 5

The droplets from 1 ml. of pipetted aqueous solution of the test compounds were dropped into a Petri dish until the droplets covered homogeneously the bottom of the dish. After the droplets were dried by airing gently, red bean beetles (Callosobruchus chinensis) were set free in the Petri dish. 24 Hours later, the number of killed insects was counted to calculate the lethal concentration ($LC_{50}$).

TABLE 5

| Test compound | Lethal concentration ($LC_{50}$) (%) |
|---|---|
| 1,3-Bis(propyldithio)-2-dimethylaminopropane hydrogen oxalate | 0.005–0.01 |
| 1,3-Dimercapto-2-dimethylaminopropane hydrogen oxalate | 0.001 |
| 1,3-Dimercapto-2-dimethylaminopropane disodium salt | 0.05 |
| 4,9-Bis(dimethylamino)-1,2,6,7-tetrathiecane dihydrogen dioxalate | 0.025 |
| 1,2-Bis(acetylthio)-3-dimethylaminopropane hydrogen oxalate | 0.002 |
| 5-Dimethylamino-1,3-dithiane-2-thione | 0.005 |
| 1,2-Dimercapto-3-dimethylaminopropane hydrogen oxalate | 0.0025–0.005 |
| 1,3-Dithiocyanato-2-dimethylaminopropane hydrogen oxalate | 0.000625–0.00125 |
| 1,3-Bis(ethoxy-thiocarbonylthio)-2-dimethylaminopropane hydrogen oxalate | 0.05–0.1 |
| 1,3-Bis(amidinothio)-2-dimethylaminopropane hydrogen oxalate dihydrochloride | 0.05–0.1 |
| 1,3-Bis(ethyldithio)-2-dimethylaminopropane hydrogen oxalate | 0.00125–0.0025 |
| 1,3-Bis(acetylthio)-2-dimethylaminopropane hydrogen oxalate | 0.0025–0.005 |

EXPERIMENT 6

The test compounds were dissolved in water containing 0.1 percent of the same sticking agent as used in Experiment 2. When the test compounds were free bases the aqueous solution was adjusted to pH 8.5 with phosphoric acid buffer solution. Twenty milliliters each per pot of the solution thus prepared were sprayed from the distance of 80 centimeters with the pressure of 1 kg./cm². Survival rate was calculated after 2 or 4 days to obtain the result shown in Table 6.

TABLE 6

| Test compound | Concentration of the test compound (percent) | Soybean aphids 2 days after | Soybean aphids 4 days after | Two-spotted mites 2 days after | Two-spotted mites 4 days after |
|---|---|---|---|---|---|
| 4,9-bis(dimethyl-amino)-1,2,6,7-tetrathiecane | 0.05 | ---- | ---- | 2.4 | ---- |
| | 0.025 | 25.4 | ---- | 27.4 | ---- |
| 4,9-bis(dimethyl-amino)-1,2,6,7-tetrathiecane dihydrogen dioxalate | 0.05 | 0.4 | 2.6 | ---- | ---- |
| 4-dimethylamino-methyl-1,3-dithiolane-2-thione | 0.025 | 58.9 | ---- | ---- | ---- |
| 1,3-bis(ethyldithio)-2-dimethylamino-propane hydrogen oxalate | 0.05 | 0.0 | 0.0 | 0.0 | ---- |
| | 0.025 | 13.0 | 11.4 | 8.5 | ---- |
| Control (malathion*) | 0.025 | 1.4 | 1.6 | 0.0 | ---- |
| Control | 0 | 102.7 | 93.1 | 111.9 | 143.3 |
| | | 129.4 | ---- | 154.3 | ---- |

*Malathion=0,0'-dimethyl S-(1,2-dicarbethoxyethyl) phosphodithioate.

EXPERIMENT 7.

A field test was carried out against striped flea beetles on 25–30 radish plants planted within the sectional area of 3 meters in length and 0.6 meter in width for each test compound. For this experiment radish plants bearing 10 to 15 leaves were used. The test solution prepared as in Table 7 was sprayed over radish plants at the rate of 13 liters per are. The number of the insects on radish plants was counted before spraying and 5 days after spraying and the survival rate was calculated as shown in Table 7.

TABLE 7

| Test compound | Concentration of the test compound | Number of striped flea beetles per radish plant | | Survival rate (percent) |
| --- | --- | --- | --- | --- |
| | | Before spraying | 5 days after spraying | |
| 4,9-bis(dimethyl-amino)-1,2,6,7- tetra-thiecane dihydrogen dioxalate | 5/10,000 | 10.5 | 2.7 | 23.7 |
| 5-dimethylamino-1,3-dithiane-2-thione hydrogen oxalate | 5/10,000 | 4.3 | 3.3 | 76.7 |
| Control | 0 | 5.4 | 5.0 | 96.6 |
| Control (EPN)* | 3/10,000 | 4.0 | 1.2 | 24.0 |

*EPN=ethyl p-nitrophenylthionobenzene phosphonate.

EXPERIMENT 8.

Test on Acute toxicity to mice ($F_1$-race) in intraperitoneal injection:

| Test compound | Dose (mg./kg.) | Killed/Used |
| --- | --- | --- |
| 1,2-Bis(propyldithio)-2-dimethylamino-propane hydrogen oxalate | 100 | 1/3 |
| | 200 | 3/3 |
| | 500 | 3/3 |
| 4-Dimethylaminomethyl-1,3-dithiolane-2-thione | 100 | 0/3 |
| | 200 | 3/3 |
| | 500 | 3/3 |

The following examples set forth presently preferred illustrative typical compounds represented by the formulas (I) of the invention and of the procedure for their preparation, and will serve to make apparent the compounds embraced by the formulas (I) and their preparation respectively. Pesticidal compositions fit for practical purposes are also described by means of exemplary compositions. It will be understood, of course, that the invention is not limited to the particular details of these examples or exemplary compositions since they are no more than examples of some preferred embodiments of the invention. In these examples are exemplary compositions, temperatures are uncorrected and shown in degrees centigrade. The abbreviation "ml." means "milliliter" or "milliliters," and respective amounts of materials shown by either of "part(s)" or "%" are on weight basis.

EXAMPLE 1.

In 50 ml. of ethanol was neutralized 3.4 grams of 1,3-dichloro-2-dimethylaminopropane hydrochloride with 0.9 gram of potassium hydroxide. The solution was gradually dropped into a mixture of 4.9 grams of sodium benzyl mercaptide and 20 ml. of ethanol with stirring at room temperature. After the addition, the mixture was warmed for a little while to separate out sodium chloride, which was then filtered off. The filtrate was concentrated under reduced pressure to leave an oily substance, which was extracted with ether. The ethereal solution was washed with water and dried over anhydrous sodium sulfate. An ethereal solution saturated with anhydrous oxalic acid was gradually added to the dried ethereal solution to separate out crystals, which were collected by filtration, decolorized and recrystallized from a mixture of ethanol and ether to give 4.5 grams of 1,3-bis(benzylthio)-2-dimethylaminopropane hydrogen oxalate as colorless crystals melting at 132°–135°.

EXAMPLE 2.

To a solution of 18.1 grams of 1,2-dichloro-3-piperidinopropane hydrochloride in a mixture of 50 ml. each of ethanol and methanol, there was added a solution of 4.4 grams of potassium hydroxide in 50 ml. of ethanol under ice-cooling with stirring, whereupon potassium chloride separated and was filtered off with suction. A mixture prepared from 3.6 grams of metallic sodium, 19.5 grams of benzyl mercaptan and 50 ml. of ethanol was added to the above-obtained filtrate and the mixture was refluxed on water bath with stirring for 2 hours. The sodium chloride separating therein was filtered off with suction and the filtrate was concentrated under reduced pressure to dryness to give oily residue, which was dissolved in ether. The ethereal solution was washed with water and dried. Ether was then evaporated to give 23.1 grams of 1,2-bis(benzylthio)-3-piperidinopropane as brown oil.

To a solution of 17.3 grams of 1,2-bis (benzylthio)-3-piperidinopropane in 100 cubic centimeters of ether was added an ethereal solution of oxalic acid to give 17.5 grams of 1,2-bis(benzylthio)-3-piperidinopropane hydrogen oxalate as white and powdery crystals melting at 126°–129° recrystallized from isopropanol.

EXAMPLE 3.

In a mixture of 100 ml. each of ethanol and methanol was dissolved 54.4 grams of 1,2-dichloro-3-diethylaminopropane hydrochloride. A mixture of 14 grams of potassium hydroxide and 150 ml. of ethanol was added to the above-prepared solution under ice-cooling, whereupon potassium chloride separated and was filtered off under suction. A mixture prepared from 11.5 grams of metalic sodium, 62.1 grams of benzyl mercaptan and 100 ml. of ethanol was added to the above-prepared filtrate and the mixture was refluxed on water bath with stirring for 2 hours, whereupon sodium chloride separated and filtered off with suction. The filtrate was concentrated under reduced pressure to dryness and the residue was dissolved in ether. The ethereal solution was washed with water, dried and concentrated to dryness to give 67.3 grams of 1,2-bis(benzylthio)--diethylaminopropane as brown oil.

EXAMPLE 4.

In 150 ml. of ethanol was neutralized 4.8 grams of 1,3-dichloro-2-dimethylaminopropane hydrochloride with 1.4 grams of potassium hydroxide. To the solution was added gradually 5.2 grams of potassium thiolacetate under agitation at room temperature. After the addition, the mixture was warmed for a little while to separate out potassium chloride, which was then filtered off. The filtrate was concentrated under reduced pressure to leave an oily substance, which was extracted with ether. The ethereal solution was washed with water, dried on anhydrous sodium sulfate and warmed to distilled off the ether to leave an oily substance. The oily residue was dissolved in dry ether and an ethereal solution saturated with anhydrous oxalic acid was added gradually to the ethereal solution to separate out crystals, which were recrystallized from a mixture of ethanol and ether to obtain 1,3-bis(acetylthio)-2-dimethylaminopropane hydrogen oxalate as colorless crystals melting at 91°–94°.

EXAMPLE 5.

A solution of 12.5 grams of 1,2-dichloro-3-dimethylaminopropane hydrochloride in 100 ml. of ethanol was neutralized with 3.6 grams of potassium hydroxide, whereupon potassium chloride separated and was filtered. To the filtrate was added an ethanolic solution of sodium thiolacetate which had been prepared from 9.9 grams of thiolacetic acid, 3 grams of metallic sodium and 100 ml. of ethanol. The mixture was allowed to stand overnight and was refluxed on the water bath for 40 minutes, whereupon sodium chloride separated and was filtered off. The filtrate was concentrated under reduced pressure to dryness and the oily residue was dissolved in ether. The ethereal solution was washed with water, and dehydrated. An ethereal solution saturated with anhydrous oxalic acid was added dropwise to the dehydrated ethereal solution to separate crystals, which were collected by filtration to obtain 6 grams of 1,2-bis(acetylthio)-3-dimethylaminopropane hydrogen oxalate, which decomposes at about 105°–115°. The crude crystals were recrystallized from methanol to give pale yellow crystals decompositing at 124°–128°.

EXAMPLE 6.

A solution of 9.6 grams of 1,2-dichloro-3-dimethylaminopropane hydrochloride in 50 ml. of ethanol was neutralized with 2.8 grams of potassium hydroxide, whereupon potassium chloride separated and was filtered off. To the filtrate, there was added a solution of 8.2 grams of sodium trithiocarbonate in 50 ml. of ethanol and the mixture was refluxed on a water bath for 1 hour. After cooling, sodium chloride separated, was filtered off and the filtrate was concentrated under reduced pressure. To the residue, there was added 100 ml. of water and extracted three times with 50 ml. each of ether. All ethereal extracts were combined and dehydrated, after which a solution of 7.5 grams of anhydrous oxalic acid in 100 ml. of ether was added to separate 8.2 grams of crude 4-dimethylaminomethyl-1,3-dithiolane-2-thione hydrogen oxalate, which decomposes at about 158°–168°. The crude crystals were recrystallized from aqueous ethanol to give yellow plates decomposition at 187°–189°.

EXAMPLE 7.

Eighty grams of gaseous ammonia was dissolved in 1.2 liters of anhydrous methanol under cooling and then hydrogen sulfide was saturated therein. To the solution was added 80 grams of 1,2-dibromo-3-dimethylaminopropane hydrochloride and the mixture was allowed to stand overnight in a sealed vessel at room temperature. Then, the mixture was boiled for 2 days, while introducing hydrogen sulfide therein. Resulting crystals were filtered off and the filtrate was concentrated under reduced pressure to leave an oily residue, which was further distilled to obtain 6.0 grams of 1,2-dimercapto-3-dimethylaminopropane, boiling at 71°–78°/mmHg.

EXAMPLE 8.

In 50 ml. of anhydrous ethanol, there was neutralized 7.9 grams of 1,3-dichloro-2-dimethylamino propane hydrochloride with 2.2 grams of potassium hydroxide to give the free amine. To the solution was added a solution of 6.1 grams of ammonium thiocyanate in 100 ml. of anhydrous ethanol and the mixture was agitated for 2 days at room temperature. After the resulting precipitate had been filtered off, the filtrate was concentrated under reduced pressure to leave an oily substance, which was dissolved in ether. The ethereal solution was washed with water and dried. An anhydrous oxalic acid solution in ether was added to the dried ethereal solution to separate crystals, which were collected and recrystallized from a mixture of ethanol and ether to give 7.4 grams of 1,3-dithiocyanato-2-dimethylaminopropane hydrogen oxalate, melting at 123°–124° with decomposition.

EXAMPLE 9.

In 50 ml. of anhydrous ethanol was neutralized 7.9 grams of 1,3-dichloro-2-dimethylaminopropane hydrochloride with 2.2 grams of potassium hydroxide to give free amine. The free amine was added to a solution of 12.8 grams of potassium ethylxanthogenate in 150 ml. of anhydrous ethanol and the mixture was stirred for 2 days at room temperature. The resulting reaction mixture was treated in a similar manner to the preceding example to give 2.9 grams of 1,3-bis(ethoxythiocarbonylthio)-2-dimethylaminopropane hydrogen oxalate, melting at 115°–116° with decomposition.

EXAMPLE 10.

In 50 ml. of anhydrous ethanol was neutralized 4.9 grams of 1,3-dichloro-2-dimethylaminopropane hydrochloride with 1.4 grams of potassium hydroxide to give the free amine. The free amine was added to a solution of 8.6 grams of sodium N,N-diethyldithiocarbamate in 150 ml. of anhydrous ethanol and the mixture was stirred for 2 days at room temperature. The resulting reaction mixture was treated in a similar manner to the preceding example. The obtained crystals were recrystallized from ethanol to give 2.9 grams of 1,3-bis(N,N-diethylthiocarbamoylthio)-2-dimethylaminopropane hydrogen oxalate, melting at 118°–120° with decomposition.

EXAMPLE 11.

In 50 ml. of anhydrous ethanol was neutralized 7.9 grams of 1,3-dichloro-2-dimethylaminopropane hydrochloride with 2.2 grams of potassium hydroxide to give the free amine. The free amine was added to a solution of 6.1 grams of thiourea in 100 ml. of anhydrous ethanol and the mixture was stirred for 2 days at room temperature. The resulting reaction mixture was treated in a similar manner to the preceding example to give 2.8 grams of 1,3-bis(amidinothio)-2-dimethylaminopropane hydrogen oxalate dihydrochloride, melting at 106°–108° with decomposition.

EXAMPLE 12.

In 100 ml. of 50 percent aqueous ethanol was neutralized 9.6 grams of 1,3-dichloro-2-dimethylaminopropane hydrochloride with 2.0 grams of sodium hydroxide to give the free amine, and 24.8 grams of sodium thiosulfate was added thereto. The mixture was heated for a little while, and concentrated under reduced pressure to leave a pale brown oily substance.

On the other hand, 6.2 grams of ethyl mercaptan was dissolved in 50 ml. of 2-normal aqueous sodium hydroxide solution and the solution was saturated with sodium chloride. The above-obtained oily substance was gradually added to the above-prepared solution. After being kept at room temperature for about 5 to 6 hours, the mixture was extracted twice with ether. The ethereal solutions were combined, washed with water and dried.

An anhydrous oxalic acid solution in ether was added to the dried ethereal solution to separate crystals, which were collected and recrystallized from a mixture of ethanol and ether to give 2.2 grams of 1,3-bis(ethyldithio)-2-dimethylaminopropane hydrogen oxalate melting at 113°–115° with decomposition.

EXAMPLE 13.

A mixture of 24 grams of sodium sulfide and 32 grams of sulfur powder was warmed on the water bath to give a uniform solution colored in red orange, and 375 ml. of water and 15 grams of anhydrous potassium carbonate were added thereto. The mixture was cooled with a freezing mixture. A solution of 15 grams of 1,3-dichloro-2-dimethylaminopropane hydrochloride in 75 ml. of water was gradually dropped into the cooled mixture with stirring, during which the reaction temperature was kept at a temperature from −2° to −3°. After the addition, the reaction mixture was allowed to stand at −2° to −3° in a refrigerator for 2 days. Then, at room temperature, 50 ml. of 6-normal aqueous sodium hydroxide solution and 0.25 gram of potassium cyanate were added to the reaction mixture and the resulting mixture was extracted twice with chloroform. The extract was treated in a similar manner to the preceding example to give 4.2 grams of 4,9-bis(dimethylamino)-1,2,6,7-tetrathiocane dihydrogen dioxalate melting at 151°–154° with decomposition.

EXAMPLE 14.

In 50 ml. of anhydrous ethanol 7.9 grams of 1,3-dichloro-2-dimethylaminopropane hydrochloride were changed into the free base with 2.2 grams of potassium hydroxide. The resulting free amine was added to the solution of sodium O,O'-diethylphosphorodithioate, which had been prepared from 15.1 grams of O,O'-diethylphosphorodithioic acid and the sodium alcoholate solution prepared from 1.8 grams of metallic sodium and 100 ml. of ethanol, and the mixture was agitated for 2 days at room temperature. Crystallizing sodium chloride was filtered off and the filtrate was concentrated to leave an oily substance. The residue was dissolved in ether and the ethereal solution was washed and dehydrated. To the dried ethereal solution was added 5 percent ethereal solution of anhydrous oxalic acid to crystallize the objective compound, which was filtered and recrystallized from a mixture of ethanol and ether to give 8.6 grams of 1,3-bis(diethoxyphosphinothioylthio)-2-dimethylaminopropane hydrogen oxalate, melting at 80°–82° with decomposition.

The same procedure as mentioned above was brought about except that 14.5 grams of O,O'-diethyl phosphorothiolic acid was used in place of 15.1 grams of O,O'-diethylphosphorodithiolic acid, whereupon 1,3-bis(diethoxyphosphinothio)-2-dimethylaminopropane hydrogen oxalate was obtained.

EXAMPLE 15

A mixture of 15 grams of 1,3-bis(benzylthio)-2-chloropropane and 45 ml. of 31 percent solution of dimethylamine in benzene was placed in a pressure vessel and heated at 160° for 16 hours. After cooling, resultant dimethylamine hydrochloride was filtered off and the filtrate was concentrated under reduced pressure to dryness. The residue was dissolved in a small amount of water and extracted with 50 ml. of ether, and the ethereal solution was dried over anhydrous sodium sulfate. To the ethereal extract, an ethereal solution saturated with oxalic acid was added until no more precipitate settled. The precipitates were collected and recrystallized to give 11 grams of 1,3-bis(benzylthio)-2-dimethylaminopropane hydrogen oxalate, melting at 132°–135°.

EXAMPLE 16

A mixture of 7.5 grams of crude 1,3-dibenzylthio-2-chloropropane and 24ml. of 33 percent solution of diethylamine in benzene was placed in a pressure vessel and heated at 160° for 14 hours. After cooling, resulting diethylamine hydrochloride was filtered off and the filtrate was concentrated under reduced pressure to dryness. A small amount of water and 20 cubic centimeters of ether were added to the residue and an ethereal solution saturated with oxalic acid was added thereto until no more precipitate arose. The precipitates were collected and recrystallized to give 5.5 grams of 1,3-bis(benzylthio)-2-diethylaminopropane hydrogen oxalate, melting at 135°–142°.

EXAMPLE 17.

A mixture of 15 grams of 1,3-bis(ethoxythiocarbonylthio)-2-bromopropane and 45 ml. of 33 percent solution of diethylamine in benzene was heated on water bath for 3 hours. After cooling, resultant inorganic salts were removed by filtration and the filtrate was concentrated under reduced pressure to dryness. The residue was dissolved in diluted acetic acid and the solution was extracted with ethyl acetate to remove the impurities soluble in the solvent. The aqueous layer was adjusted to pH 9.0 with sodium carbonate and extracted twice with 50 ml. each of ether. An ethereal solution saturated with oxalic acid was added to the ethereal exacts until no more precipitate settled. The precipitates were collected and recrystallized to give 1.5 grams of 1,3-bis(ethoxythiocarbonythio)-2-diethylaminopropane hydrogen oxalate.

EXAMPLE 18.

Five grams of 1,3-bis(ethylthio)-2-chloropropane and 20 grams of morpholine were heated in 50 ml. of toluene for 7 hours under reflux. After cooling, resulting crystals were filtered off and the filtrate was concentrated under reduced pressure to dryness. The oily residue was dissolved in ether. The ethereal solution was washed with water and dried. An ethereal solution saturated with oxalic acid was added to the dried ethereal solution until no more precipitate settled. The precipitates were collected and recrystallized from acetone to give 4.7 grams of 1,3-bis(ethylthio)-2-morpholinopropane hydrogen oxalate as colorless crystals melting at 121°–123°.

EXAMPLE 19.

Five grams of 1,3-bis(ethylthio)-2-chloropropane and 20 grams of piperidine were heated in 50 ml. of toluene under reflux for 10 hours. After cooling, resultant crystals were filtered off and the filtrate was concentrated under reduced pressure to dryness. The oily residue was dissolved in ether and the ethereal solution was washed with water and dehydrated. An ethereal solution saturated with oxalic acid was added to the dehydrated ethereal solution until no more precipitate settled. The precipitates were collected and recrystallized to give 3.2 grams of 1,3-bis(ethylthio)-2-piperidinopropane hydrogen oxalate, melting at 120°–124°.

EXAMPLE 20.

Five grams of 1,3-bis(ethylthio)-2-chloropropane and 20 grams of pyrrolidine was heated in 50 ml. of benzene under reflux for 14 hours. After cooling, resulting crystals were filtered off and the filtrate was treated in the same manner as in the preceding example to obtain 3.5 grams of 1,3-bis(ethylthio)-2-pyrrolidinopropane hydrogen oxalate melting at 110°–113°.

EXAMPLE 21.

A mixture of 10 grams of 1,3-bis(benzylthio) propan-2-one, 70 ml. of dimethylformamide and 70 ml. of 85 percent formic acid was placed in a vessel equipped with the apparatus for dehydration and was heated on oil bath at 180° for 10 hours. The reaction mixture was concentrated under reduced pressure and the residue was extracted with ether. The ethereal extract was extracted with 5 percent hydrochloric acid to collect amine product The aqueous layer was alkalified with diluted aqueous solution of sodium hydroxide and extracted with ether. The ethereal solution was washed with water, dried over sodium sulfate and concentrated to dryness to give crude 1,3-bis(benzylthio)-2-dimethylaminopropane, which was dissolved in ether and the solution was shaken together with an aqueous solution of oxalic acid to give 1.5 grams of the corresponding hydrogen oxalate melting at 132°–135°.

EXAMPLE 22.

Ten grams of 2-phenyl-5-hydroxy-1,3-dithiane was dissolved in a mixture of 45 ml. of benzene and 2 ml. of pyridine. Twenty milliliters of thionyl chloride was added to the solution under ice-cooling with stirring, and the reaction was brought about for 2 hours at room temperature. The reaction mixture was poured into ice-water. The aqueous mixture was extracted with ether. The ethereal solution was dehydrated and concentrated to give 9.5 grams of 2-phenyl-5-chloro-1,3-dithiane.

The compound thus obtained was dissolved in 50 ml. of benzene. The solution was mixed with 20 ml. of 32 percent-dimethylformamide in benzene, and the mixture was heated at 160° for 16 hours in an autoclave. The reaction mixture was concentrated and the concentrate was extracted with ether. An ethereal solution saturated with oxalic acid was added to the ethereal extract to crystallize the objective compound, which was filtered and recrystallized from a mixture of ethanol and ether to give 4.0 grams of 2-phenyl-5-dimethylamino-1,3-dithiane hydrogen oxalate, melting at 141°–143° with decomposition.

EXAMPLE 23.

Nine and half grams of 2-phenyl-4-hydroxymethyl-1,3-dithiolane was allowed to react with thionyl chloride in a similar way to the procedure in the preceding example to give 2-phenyl-4-choromethyl-1,3-dithiolane.

The compound was allowed to react with dimethylamine in benzene at 160° for 16 hours in an autoclave to give 4.0 grams of 2-phenyl-4-dimethylaminomethyl-1,3-dithiolane, which was recrystallized as the hydrogen oxalate to melt at 132° with decomposition.

EXAMPLE 24.

A mixture of 40 ml. of anhydrous ethanol and 80 ml. of liquid ammonia was cooled with dryice. A solution of 4.9 grams of 1,3-bis(benzylthio)-2-dimethylaminopropane in 40 ml. of anhydrous ethanol and 1.9 grams of metallic sodium were alternatively added to the cooled mixture under agitation, and agitation was further continued for 30 minutes. Then, ammonia and ethanol were distilled off and 50 ml. of water was added to the residue. The aqueous mixture was extracted with ether to remove impurities soluble in ether. The aqueous layer was adjusted to pH 9.0 by the addition of hydrochloric acid and saturated with sodium chloride. A solution of 6 grams of sodium benzylthiolsulfate in 20 ml. of water was dropped into the above-prepared solution under agitation, whereupon an oily substance separated, which was extracted with ether. The ethereal extract was mixed with 25 ml. of 7 percent aqueous oxalic acid solution; the mixture was vigorously shaken and allowed to stand overnight to obtain 2.1 grams of 1,3-bis(benzyldithio)-2-dimethylaminopropane hydrogen oxalate as colorless crystals melting at 115°–119°.

EXAMPLE 25.

1,3-Dimercapto-2-dimethylaminopropane, which had been prepared from 4.9 grams of 1,3-bis(benzylthio)-2-dimethyl aminopropane in the same manner as in the preceding example, was dissolved in 50 ml. of water and the aqueous solution was adjusted to pH 9.0 with the addition of hydrochloric acid and saturated with sodium chloride. A solution of 20 grams of sodium propylthiolsulfate in 25 ml. of water was added to the aqueous solution saturated with sodium chloride, whereupon an oily substance separated, which was extracted with 80 ml. of ether. The ethereal extract was mixed with 25 ml. of 7 percent aqueous oxalic acid solution. The mixture was shaken and allowed to stand overnight to obtain 1.5 grams of 1,3-bis(propyldithio)-2-dimethylaminopropane hydrogen oxalate as colorless crystals melting at 130°–134°.

EXAMPLE 26.

A solution of 3 grams of 1,2-dimercapto-3-dimethylaminopropane in 30 ml. of water was adjusted pH 9.0 with 10 percent aqueous sodium hydroxide solution and saturated with sodium chloride. A solution of 6 grams of sodium benzylthiolsulfate in 20 ml. of water was added to the solution saturated with sodium chloride under agitation, whereupon an oily substance separated, which was extracted three times with 30 ml. each of ether. The ethereal extacts were combined and mixed with 25 ml. of 7 percent aqueous oxalic acid solution. The mixture was shaken and allowed to stand overnight to allow the objective compound to crystallize, which was filtered and recrystallized to obtain 2 grams of 1,2-bis(benzyldithio)-3-dimethylaminopropane hydrogen oxalate as colorless crystals melting at 115°.

EXAMPLE 27.

A solution of 3 grams of 1,2-dimercapto-3-dimethylaminopropane-1,2-dithiol in 30 ml. of water was adjusted to pH 9.0 with 10 percent aqueous sodium hydroxide solution and saturated with sodium chloride. A solution of 20 grams of sodium propylthiolsulfate in 20 ml. of water was added to the solution saturated with sodium chloride, whereupon an oily substance separated, which was extracted three times with 30 ml. each of ether. The ethereal extracts were combined and mixed with 25 ml. of 7 percent aqueous oxalic acid solution. The mixture was shaken and allowed to stand overnight to crystallize the objective compound, which was filtered and recrystallized to obtain 1.5 grams of 1,2-bis(propyldithio)-3-dimethylaminopropane hydrogen oxalate as colorless crystals melting at 128°–132°.

EXAMPLE 28.

A mixture of 40 ml. of anhydrous ethanol and 80 ml. of liquid ammonia was cooled with dry-ice. A solution of 4.6 grams of 1,3-bis(benzylthio)-2-dimethylaminopropane in 40 ml. of anhydrous ethanol and 1.9 grams of metallic sodium were alternatively added to the cooled mixture with stirring to allow the reaction to take place. After the reaction ended, ammonia and ethanol were distilled off. The oily residue was dissolved in 50 ml. of water and the solution was extracted with ether to remove oily substances insoluble in water. The aqueous layer was separated and 6.2 grams of benzoyl chloride was dropped into the separated solution under ice-cooling and agitation. After 30 minutes from the end of the addition, oily substance separating was extracted with 80 ml. of ether. The ethereal extract was mixed with 25 ml. of 7 percent aqueous solution of oxalic acid. The mixture was shaken and allowed to stand overnight, whereupon the objective compound crystallized, which was filtered and dried to give 2.1 grams of 1,3-bis(benzoylthio)-2 -dimethylaminopropane hydrogen oxalate as white leaflet crystals melting at 154°–156°.

EXAMPLE 29.

1,3-Dimercapto-2-dimethylaminopropane, which had been prepared from 4.6 grams of 1,3-bis(benzylthio)-2-dimethylaminopropane in the same manner as in the preceding example, was dissolved in 50 ml. of water, and 6.5 grams of furoyl chloride was dropped into the aqueous solution. After 30 minutes from the end of the addition, oily substance separating was extracted with 80 ml. of ether. The ethereal extract was mixed with 25 ml. of 7 percent aqueous solution of oxalic acid. The mixture was shaken and allowed to stand overnight, whereupon the objective compound crystallized, which was filtered and dried to give 2.5 grams of 1,3-bis(furoylthio)-2-dimethylaminopropane hydrogen oxalate as white crystals melting at 152°–158°.

EXAMPLE 30.

Into a solution of 2.1 grams of 1,2-dimercapto-3-dimethylaminopropane and 3.2 grams of sodium hydroxide in 50 ml. of water was dropped 6.2 grams of benzoyl chloride under ice-cooling and agitation. After 30 minutes from the end of the addition, oily substance separating was extracted with 80 ml. of ether. The ethereal extract was mixed with 25 ml. of 7 percent-aqueous solution of oxalic acid. The mixture was shaken and allowed to stand overnight, whereupon the objective compound crystallized, which was filtered and dried to obtain 2.1 grams of 1,2-bis(benzoylthio)-3-dimethylaminopropane hydrogen oxalate as white leaflet crystals melting at 154°–156°.

EXAMPLE 31.

Into a solution of 2.1 grams of 1,2-dimercapto-3-dimethylaminopropane and 3.2 grams of sodium hydroxide in 50 ml. of water was dropped 6.5 grams of furoyl chloride under ice-cooling and agitation. After 30 minutes from the end of the addition, oily substance separating was extracting with 80 ml. of ether. The ethereal extract was mixed with 25 ml. of 7 percent aqueous solution of oxalic acid. The mixture was shaken and allowed to stand overnight, whereupon the objective compound crystallized, which was filtered and dried to give 2.5 grams of 1,2-bis(furoylthio)-3-dimethylaminopropane hydrogen oxalate as white crystals melting at 152°–158°.

EXAMPLE 32.

A solution of 2.7 grams of 1,2-dimercapto-3-dimethylaminopropane and 4.2 grams of sodium hydroxide in 70 ml. of water was saturated with sodium chloride, and 8 grams of acetic anhydride was dropped into the aqueous solution under ice-cooling and agitation. Then, after adding 80 ml. of ether thereto, the mixture was agitated for additional 30 minutes. The ether layer was separated, dried and mixed with the ethereal solution saturated with oxalic acid. The mixture was shaken and allowed to stand overnight, whereupon the objective compound crystallized, which was filtered and dried to obtain 5 grams of 1,2-bis(acetylthio)-3-dimethylaminopropane hydrogen oxalate as white powdery crystals melting at 115°–116°C.

EXAMPLE 33.

A mixture of 40 ml. of anhydrous ethanol and 80 ml. of liquid ammonia was cooled with dry-ice. A solution of 4.9 grams of 1,3-bis(benzylthio)-2-dimethylaminopropane in 40 ml. of anhydrous ethanol and 1.9 grams of metallic sodium were alternately added to the cooled mixture. After the mixture was agitated for 30 minutes, ethanol and ammonia were distilled off to leave 3.6 grams of crude 1,3-dimercapto-2-dimethylaminopropane.

The crude product was dissolved in water. The solution was neutralized with hydrochloric acid, saturated with sodium chloride and extracted several times with ethyl acetate. The ethyl acetate extracts were combined, dehydrated and concentrated under reduced pressure to give 2.3 grams of further purified 1,3-dimercapto-2-dimethylaminopropane.

EXAMPLE 34.

One gram of 4-dimethylaminomethyl-2-phenyl-1,3-dithiolane was dissolved in a mixture of 20 ml. of ether and 50 ml. of liquid ammonia. To the solution under agitation was added 0.5 gram of metallic lithium bit by bit, whereupon the reaction mixture turned to deep blue in color. The blue color disappeared upon adding 5 ml. of ethanol to the mixture after the reaction had ended. The solvent was distilled off and the residue was dissolved in ice-water. The solution was extracted with ether. The ether layer was separated from the aqueous layer. The ethereal extract was dehydrated and mixed with an ethereal solution of oxalic acid to separate 0.5 grams of crystals, which were recrystallized from ethanol to give 4-dimethylamino-1,2-dithiolane hydrogen oxalate melting at 169°–170° with decomposition.

The aqueous layer separated from the ethereal extract was alkalified. Benzoyl chloride was added to the alkaline aqueous solution to allow the reaction to take place. The reaction mixture was extracted with ether and the ethereal extract was processed in an ordinary manner to give 0.4 gram of 1,2-bis(benzoylthio)-3-dimethlaminopropane hydrogen oxalate which melts 156° with decomposition.

Instead of the metallic lithium above-used in this example, 1 gram of metallic sodium was used to carry out the reaction with the essentially same result as mentioned above.

EXAMPLE 35.

One gram of 4-dimethylaminomethyl-2-phenyl-1,3-dithiolane was dissolved in a mixture of 20 ml. of ether and 50 ml. of liquid ammonia. To the solution under agitation, 0.5 gram of metallic lithium was added, whereupon the reaction mixture turned to deep blue in color. After 6 ml. of ethanol was gradually added to the reaction mixture, the solvent was distilled off under reduced pressure. The residue was dissolved in water and the solution was extracted with ether. An ethereal solution of oxalic acid was added to the ethereal extract separated from the aqueous layer to give 0.4 gram of 4-dimethylamino-1,2-dithiolane hydrogen oxalate, melting at 169° with decomposition.

Benzoyl chloride was added to the alkaline aqueous layer separated from the ethereal extract and the reaction mixture was treated in the same way as in the preceding example to obtain 0.3 gram of 1,2-bis(benzoylthio)-3-dimethylaminopropane hydrogen oxalate, melting at 156° with decomposition.

EXAMPLE 36.

To a solution of 2.7 grams of 2-phenyl-5-dimethylamino-1,3-dithiane hydrogen oxalate dissolved in 100 ml. of water was added in aqueous solution of mercuric chloride. The mixture was warmed on water bath for 10 minutes, whereupon benzaldehyde was produced and a mercaptide precipitated. The precipitate was filtered to obtain 4 grams of crude mercaptide melting at 100°–109° with decomposition. The crude mercaptide was suspended in 100 ml. of water and hydrogen sulfide was introduced into the suspension. After filtration, the filtrate was adjusted to pH 8.0 and extracted with ether. The ethereal extract was dehydrated and mixed with an ethereal solution of oxalic acid to obtain 1.8 grams of 1,3-dimercapto-2-dimethylaminopropane hydrogen oxalate melting at 150° with decomposition.

EXAMPLE 37.

1,3-Dichloro-2-dimethylaminopropane hydrochloride in an amount of 9.6 grams was allowed to react with 24.8 grams of sodium thiosulfate in water to give an aqueous solution of the disodium salt of 1,3-bis(sulfothio)-2-dimethylaminopropane. The aqueous solution was dropped into an aqueous solution of 7.5 grams of disodium salt of 1,3-dimercapto-2-dimethylaminopropane, which had been saturated with sodium chloride and thoroughly cooled with ice-water. The resulting reaction mixture was extracted with ether. The ethereal extract was washed with water and dried. An anhydrous ethereal solution of oxalic acid was added to the dried ethereal solution to separate crystals, which were filtered and recrystallized from a mixture of ethanol and ether to give 4.2 grams of 4,6-bis(dimethylamino)-1,2,6,7-tetrathiecane dihydrogen dioxalate as pale yellow leaflets melting at 154°–156° with decomposition.

EXAMPLE 38.

Into a solution of 1,3-dimercapto-7-dimethylaminoheptane in methanol, prepared by adding 2.5 grams of sodium boron hydride into a solution of 5.1 grams of 3-dimethylaminobutyl-1,2-dithiolane in 50 ml. of methanol and by allowing the mixture to stand for 20 minutes-, there was added 17 grams of benzyl chloride, and the mixture was stirred for five minutes at room temperature and for further one hour on water bath. The reaction mixture was concentrated to leave an oily substance, which was extracted with ether. The ethereal solution was washed with water and dried over anhydrous sodium sulfate. An ethereal solution of anhydrous oxalic acid was added to the dried ethereal solution to separate yellow oil. The yellow oil was collected, mixed with 20 percent aqueous potassium solution and extracted with ether. The ethereal solution was washed with water, dried and concentrated to give 1.3 grams of 1,3-bis(benzylthio)-7-dimethylaminoheptane as an undistillable oil.

COMPOSITION 1.

One part of 1,3-bis(benzylthio)-2-diethylaminopropane was adsorbed on 1.5 parts of diatomaceous earth and admixed with 1.5 parts of silicic acid (white carbon). The mixture was diluted with 96 parts of talc to prepare 1 percent-dust composition to be used for fruit trees.

COMPOSITION 2.

In 30 parts of methyl ethyl ketone was dissolved 5 parts of 1,3-dithiocyanate-2-dimethylaminopropane, and to the solution was added a solution of 10 parts of a surfactant (which mainly consists of 70 percent of polyoxyethylenealkylphenylethers and 30 percent of sodium arylsulfonates and is sold by Takemoto-Yushi Co., Japan under the trade name "Newkalgen 1515") in 55 parts of toluene to prepare 5 percent emulsifiable solution to be used for rice plants.

COMPOSITION 3.

Forty-five parts of finely pulverized 1,3-dimercapto-2-dimethylaminopropane hydrogen oxalate was mixed with 5 parts of silicic acid (the aqueous suspension of which is neutral), and to the mixture were added 48 parts of the fine-grained clay used in paper making and 2 parts of sodium ligninsulfonate. The mixture was finely pulverized and admixed to prepare 45 percent wettable powder to be used for vegetables.

COMPOSITION 4.

A solution of 5 parts of abietic acid polyglycol ester in 10 parts of acetone was adsorbed on 35 parts of finely pulverized 1,2-dimercapto-3-dimethylaminopropane hydrogen oxalate and the mixture was dried in air at a temperature lower than 60°. To the dried mixture were added 58 parts of finely grained clay and 2 parts of sodium ligninsulfonate and the mixture was thoroughly pulverized and admixed to prepare 35 percent wettable powder to be used for fruit trees.

COMPOSITION 5.

One part of 1,3-bis(ethylthio)-2-morpholinopropane was adsorbed on a mixture of 1 part of bentonite and 1.3 parts of diatomaceous earth and the mixture was granulated in a granulator. On the other hand, 10 parts of lactose was wetted with a small amount of starch paste and dried also to form granules. Both granules prepared as above and 1 part of talc were admixed and the mixture was punched to prepare 7 percent tablets of 15 millimeters in diameter, which are used as nematocide.

COMPOSITION 6.

In a mixture of 15 parts of cyclohexanone and 30 parts of methylnaphthalene was dissolved 25 parts of 4-dimethylaminomethyl-1,3-dithiolane-2-thione. To the solution was added 30 parts of a surfactant (which mainly consists of 70 percent of polyoxyethylene alkylphenylethers and 30 percent of organic sulfonates and is sold by Takemoto-Yushi Co., Japan under the trade name "Newkalgen 155-H") and the mixture was uniformly dissolved under agitation to prepare 25 percent emulsifiable solution to be used for vegetatives.

COMPOSITION 7.

In 50 parts of ethylene glycol monomethyl ether was dissolved 15 parts of 1,3-bis(dimethoxyphosphinothioylthio)-2-dimethylaminopropane hydrogen oxalate. Into the solution were added and dissolved 20 parts of a surfactant (which mainly consists of 70 percent of polyoxyethylenealkylphenylethers and 30 percent of organic sulfonates and is sold by Toho Kagaku Co., Japan under the trade name "Sorpol 2283T") and 15 parts of xylene, to prepare 15 percent emulsifiable solution to be used for fruit trees.

COMPOSITION 8.

One and half parts of 1,3-bis(amidinothio)-2-dimethylaminopropane hydrogen oxalate dihydrochloride, 0.5 part of silicic acid and 8 parts of talc were admixed and finely pulverized. The pulverized mixture was diluted with 90 parts of the clay, whose apparent specific gravity was about 0.5–0.6, to prepare 1.5 percent dust composition to be used for fruit trees.

COMPOSITION 9.

Fifty parts of 1,2-bis(ethoxythiocarbonylthio)-3-dimethylaminopropane was mixed with 15 parts of benzene, 15 parts of a surfactant (which mainly consists of polyoxyethylenediphenylethers and is sold by Takemoto-Yushi Co., Japan under the trade name "Newkalgen 2005") and 20 parts of another surfactant (which mainly consists of polyoxyethylenealkylphenylethers and is sold by Takemoto-Yushi Co., Japan under the trade name "Newkalgen P-55") to prepare 50 percent emulsifiable solution to be used for fruit trees.

COMPOSITION 10.

In 8 parts of methanol was dissolved 2 parts of 4,9-bis(dimethylamino)-1,2,6,7-tetrathiecane under warming. The solution was sprayed on 35 parts of talc, which had been warmed at a temperature of about 50° to 60° in ribbon blender with heating jacket, whereupon the principal ingredient was adsorbed on the talc and methanol was driven off as its vapor. The talc adsorbing the principal ingredient was diluted with 63 parts of dicalite (a kin- of clay) to prepare 2 percent dust composition to be used for vegetables.

COMPOSITION 11.

Fifty parts of 1,2-bis(isopropyldithio)-3-dimethylaminopropane hydrogen oxalate was pulverized in a fluid energy mill and was mixed with 50 parts of potassium chloride. The mixture was again pulverized in a disintegrator to prepare 50 wettable powder to be used for vegetables.

COMPOSITION 12.

Ten parts of 1,3-bis(benzyldithio)-2-dimethylaminopropane hydrogen oxalate was pulverized. To the pulverized compound were added 2 parts of sodium ligninsulfonate, 5 parts of polyoxyethyleneoctyphenylether, 3 parts of silicic acid and 80 parts of clay, and the mixture was thoroughly admixed to prepare 10 percent wettable powder.

COMPOSITION 13.

Forty parts of 1,3-bis(ethylthio)-2-piperidinopropane hydrogen oxalate was pulverized. To the pulverized compound were added 2 parts of sodium ligninsulfonate, 5 parts of polyoxyethyleneonylphenylether, 6 parts of silicic acid and 47 parts of fine-grained clay, and the mixture was thoroughly admixed to prepare 40 percent wettable powder.

COMPOSITION 14.

Two parts of thoroughly pulverized 1,3-bis(ethoxythiocarbonylthio)-2-diethylaminopropane hydrogen oxalate was diluted with 98 parts of talc to prepare 2 percent dust composition.

We claim:

1. A compound of the formula

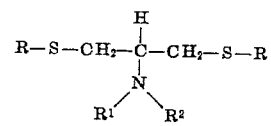

wherein R represents lower alkoxy-thiocarbonyl and
$R^1$ and $R^2$ independently represent a member of the group consisting of lower alkyl, cyclohexyl and phenyl.

2. 1,3-Bis(ethoxythiocarbonylthio)-2-dimethylaminopropane.

3. 1,3-Bis(ethoxythiocarbonylthio)-2-diethylaminopropane.

* * * * *